United States Patent
Fields et al.

[19]

[11] Patent Number: 6,041,571
[45] Date of Patent: Mar. 28, 2000

[54] MAGNETIC COUPLING FOR A CAPPING APPARATUS

[75] Inventors: Acie R. Fields, Danielsville; Stanley J. Puskarz, Athens, both of Ga.

[73] Assignee: Fowler Products Company, Athens, Ga.

[21] Appl. No.: 09/208,672

[22] Filed: Dec. 10, 1998

Related U.S. Application Data

[60] Provisional application No. 60/072,930, Jan. 29, 1998.

[51] Int. Cl.[7] .............................. B65B 7/28; F16D 27/01; H02K 7/10
[52] U.S. Cl. ...................... 53/331.5; 310/75 D; 310/103; 464/29
[58] Field of Search .................................. 53/317, 331.5; 310/75 D, 103; 403/DIG. 1; 464/29

[56] References Cited

U.S. PATENT DOCUMENTS

| | | | |
|---|---|---|---|
| 2,437,871 | 3/1948 | Wood | 310/103 |
| 4,485,609 | 12/1984 | Kowal | 53/317 |
| 4,633,646 | 1/1987 | Ellis et al. | 53/331.5 |
| 5,313,765 | 5/1994 | Martin | 53/317 |
| 5,691,587 | 11/1997 | Lamb | 310/103 |

*Primary Examiner*—John Sipos
*Attorney, Agent, or Firm*—Gardner & Groff, P.C.

[57] ABSTRACT

A capping apparatus and a magnetic coupling assembly therefor comprises a capping head for applying a cap, a drive mechanism for driving the capping head, and a separable magnetic coupling for selectively coupling the capping head to the drive mechanism. The separable coupling is operable to selectively drive the capping head at an initial rotational speed and for selectively de-coupling the capping head from the drive mechanism while the capping head is rotating. This allows the capping head to be moved toward a container to place the cap on the container while preventing the drive mechanism from continuing to drive the capping head as the cap is placed on the container.

9 Claims, 5 Drawing Sheets

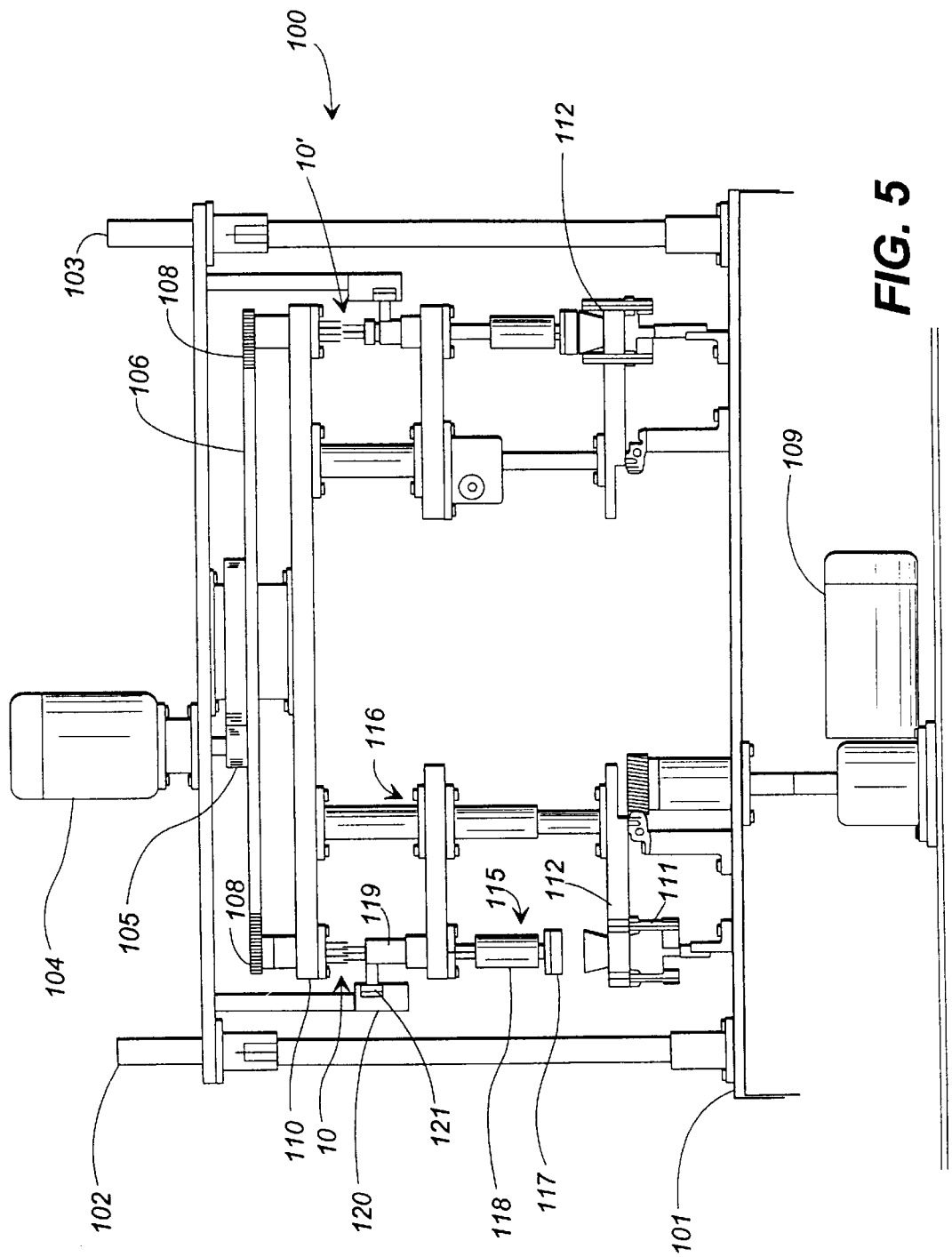

MAGNETIC COUPLING FOR A CAPPING APPARATUS

This application claims benefit of Provisional Application Serial No. 60/072,930 filed Jan. 29, 1998.

TECHNICAL FIELD

The present invention relates generally to bottling and packaging equipment, and in particular relates to a capping apparatus for placing a cap on a bottle or container.

BACKGROUND OF THE INVENTION

In the beverage industry, food industry, and in other industries, it is common to fill a container and then to put some sort of a cap on the container by spin-welding. In spin-welding, the cap (typically plastic) is spun and placed on top of the container (also typically plastic). The contact between the cap and the container creates friction and heat, thereby welding the cap to the container and providing a good seal. However, known capping equipment generally suffers from driving the cap onto the container with a certain torque, which can damage the container or cap. Known equipment also tend to require the use of lubricants, and can allow such lubricants or particulate matter to fall into the material held within the bottle or container. Also, known prior art capping apparatus tend to be large and massive and can require substantial maintenance.

Accordingly, it can be seen that a need yet remains for a capping apparatus and a coupling therefor in which the cap can be applied without the presence of a drive torque, which does not require a lubricant, which prevents lubricant or particulate matter from contaminating the material within the container, and which is small and easily maintained. It is to the provision of such a capping apparatus and a coupling therefore that the present invention is primarily directed.

SUMMARY OF THE INVENTION

Briefly described, in a first preferred form the present invention comprises a magnetic coupling for coupling a driven head with a drive mechanism. The magnetic coupling comprises a first part and a second part which is selectively insertable into the first part. One of the first and second parts has mounted therein permanent magnets and the other of the first and second parts has a magnetic portion to cooperate with the permanent magnets and to thereby be driven by the permanent magnets. With the second part inserted into the first part, rotational power can be transmitted from the permanent magnets to the magnetic portion. With the second part withdrawn from the first part, the rotational power is not transmitted from the permanent magnets to the magnetic portion and the driven head is thereby de-coupled from the drive mechanism.

Preferably, the permanent magnets include a first group of magnets in a generally cylindrical pattern and a second group of magnets also in a cylindrical pattern and arranged concentrically relative to the first group of magnets, with there being an air gap between the two groups of magnets for receiving the magnetic portion therein. Also preferably, the magnetic portion comprises a cylindrical element sized and configured to be received into the air gap. Preferably, each magnet in the first group is positioned directly across from a corresponding magnet in the second group. Further, preferably there are means for adjusting the angular position of the first group of magnets relative to the second group of magnets.

Further, the invention preferably includes a female guide element and a male guide element which cooperate to help guide the second part into the first part. Also preferably, the first group of magnets is mounted to a cylindrical magnetic backing and the second group of magnets is mounted to another cylindrical magnetic backing.

Importantly, this ability to separate the coupling into two halves and thereby to de-couple the power otherwise transmitted therethrough allows a driven head, such as a capping head, to be powered up into rotation and then, prior to the capping head applying a cap to a container, power is de-coupled from the capping head and the capping head is simply allowed to continue to turn on its own inertia. This de-coupling of a capping head from the power drive mechanism can be important in certain capping applications, such as spin welding.

In another preferred form, the present invention comprises a method of capping a container using a capping machine having a capping head for applying a cap and further having a drive mechanism. The method includes a first step of coupling a capping head to the drive mechanism using a separable coupling in order to selectively drive the capping head at a selected initial rotational speed. The method also includes a subsequent step of separating the separable coupling while the capping head is rotating, in order to de-couple the capping head from the drive mechanism, and moving the rotating capping head toward the container to place the cap on the container. In this way, as the cap is placed on the container, the driving mechanism is not driving the capping head.

In another preferred form, the present invention comprises a capping apparatus for applying a cap to a container. The apparatus includes a capping head for applying a cap and a drive mechanism. The apparatus also includes a separable coupling for selectively coupling the capping head to the drive mechanism in order to selectively drive the capping head at an initial rotational speed. The separable coupling also is operable for selectively de-coupling the capping head from the drive mechanism, while the capping head is rotating, in order that the capping head can be moved toward a container to place the cap on the container while preventing the drive mechanism from continuing to drive the rotating capping head as the cap is placed on the container.

A separable coupling for selectively coupling the capping head to the drive mechanism in order to selectively drive the capping head at an initial rotational speed and for selectively de-coupling the capping head from the drive mechanism, while the capping head is rotating, in order that the capping head can be moved toward a container to place the cap on the container while preventing the drive mechanism from continuing to drive the rotating capping head as the cap is placed on the container.

The invention has the important advantage of allowing the capping head to apply a cap without the presence of a drive torque. It also allows a coupling to be made and a clutch effected without the use of a lubricant and without having friction plates engaging one another. This avoids lubricant or particulate matter as a source of contamination. It also provides rather high torques for a relatively small package. It also adds very little inertial mass to the capping head. It also requires little or no maintenance.

Accordingly, it is a primary object of the present invention to provide a capping apparatus and magnetic coupling assembly which allows a cap to be applied to a container without the cap being driven by torque at the moment the cap is applied.

It is another object of the present invention to provide a capping apparatus and magnetic coupling assembly having a relatively high torque-to-size ratio.

It is another object of the present invention to provide a capping apparatus and coupling assembly which avoids contamination of the container being capped.

It is another object of the present invention to provide a magnetic coupling assembly which adds very little inertial mass to the capping head of a capping machine.

It is another object of the present invention to provide a capping apparatus and magnetic coupling assembly therefor which requires little maintenance.

These and other objects, features, and advantages of the present invention will become apparent upon reading the following specification in conjunction with the accompanying drawing figures.

BRIEF DESCRIPTION OF THE DRAWINGS

FIG. 5 is a schematic, sectional view of a capping apparatus according to another form of the invention and incorporating the magnetic coupling assembly of FIG. 1 therein.

DETAILED DESCRIPTION OF THE PREFERRED EMBODIMENTS

Figure 1:
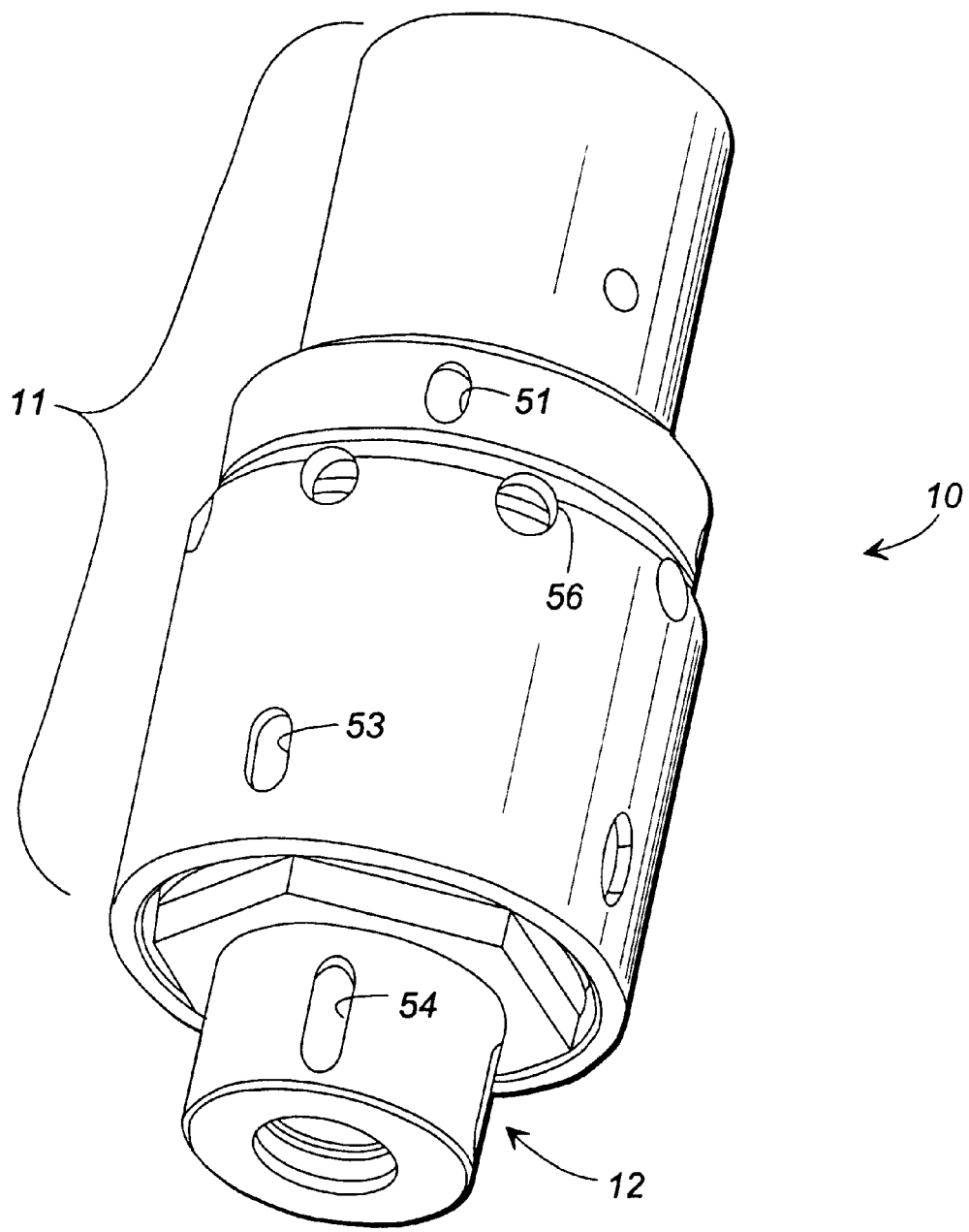
FIG. 1 is a perspective illustration of a magnetic coupling assembly according to a first preferred form of the invention.

Referring now in detail to the drawing figures, wherein like reference numerals represent like parts throughout the several views, FIG. 1 shows a magnetic coupling assembly 10 according to a preferred form of the invention. The magnetic coupling assembly 10 is intended preferably to be used with a capping apparatus, such as a spin welder. However, those skilled in the art will recognize that other applications may be appropriate for the magnetic coupling assembly. The magnetic coupling assembly 10 includes a driving part or upper receiver sub-assembly 11 and a core sub-assembly or driven part 12 closely nestably received therein.

Figure 4:
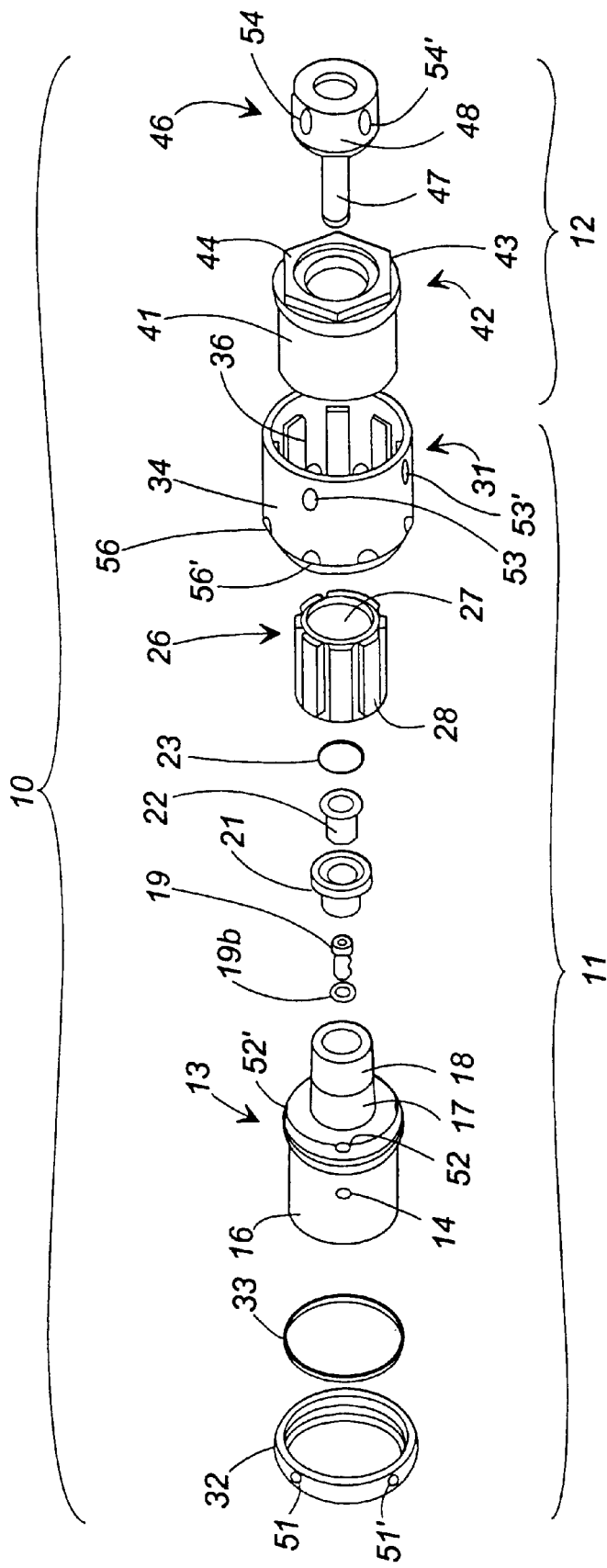
FIG. 4 is a perspective, exploded view of the magnetic coupling assembly of FIG. 1.

Referring now also to FIG. 4 in addition to FIG. 1, one can see that the receiver sub-assembly (driving part) 11 itself is made up of a number of components. The receiver sub-assembly 11 includes an adaptor 13 which is to be attached to a drive spindle of the capping apparatus. In this regard, the adaptor 13 has a set screw 14 for helping to hold the adaptor 13 securely on the drive spindle of the capping apparatus. As shown in FIG. 4, the set screw 14 is in a base portion 16 of the adaptor. The adaptor also includes a spindle base 17 and a spindle end or tip 18. A bolt 19 and lock washer 19b are used also to help secure the adaptor to the drive spindle of the capping apparatus.

An adapter bearing 21 is received in the open end of end 18 of the spindle with an interference fit. The adapter bearing 21 in turn receives a plastic low-friction bearing 22 which is smoothly fitted within the adapter bearing 21. The adapter bearing and the bearing 21 and 22 are held in place by a clip 23.

An inner magnet assembly 26 is threaded onto the spindle base 17 of the adaptor 13. The inner magnet assembly includes an inner shell 27 (which is the part which is actually threaded onto the spindle base 17). The inner shell 27 has adhered thereto a series of permanent magnets, such a permanent magnet 28, which are grouped around the outside of the inner shell 27 in a cylindrical pattern.

An outer magnet assembly 31 is fitted over the inner magnet assembly 26 and held fast to the adaptor 13 by a torque-adjusting nut 32 and a thrust washer 33. The outer magnet assembly 31 includes a cylindrical outer shell 34 and a series of permanent magnets, such as permanent magnet 36, which are arranged in a cylindrical pattern. Most preferably, there are 8 or 10 permanent magnets in each magnet assembly.

The magnetic coupling assembly 10 also includes a number of cooling holes and spanner holes. For example, the torque nut 32 includes spanner holes, such as spanner holes 51, 51'. Also, adaptor 13 includes spanner holes 52, 52' to allow the inner magnet assembly 26 to be tightly threaded onto the spindle base 17 of the adaptor 13. Further, outer shell 34 of the outer magnet assembly 31 includes spanner holes, such as spanner holes 53, 53', which allow the outer shell to be rotated relative to the torque nut 32 and then the torque nut tightened to secure the outer shell in place. Further, lower spindle 46 includes spanner holes, such as spanner holes 54 and 54' to allow the lower spindle 46 to be threaded tightly into the threaded bore of the flange 43. Moreover, the outer shell 34 has cooling holes, such as cooling hole 56, 56', 56" to help cool the magnets in operation.

The size of the magnets in the inner shell and the outer shell is pre-selected to leave a selected air gap between the magnets in the inner magnet assembly and the magnets in the outer magnet assembly. Into this air gap is received a cylindrical portion 41 of a driven member 42. The driven member 42 also includes a flange 43 including a large nut 44. The driven member 42 together with a lower spindle 46 collectively comprise the core sub-assembly or driven part 12. The lower spindle 46 includes a male guide rod 47 and a hollow, cylindrical base 48. The cylindrical base 48 is threaded into the flange 43 tightly against a shoulder to ensure good coaxial alignment of the male guide rod 47 with the cylinder 41.

Figure 2A:
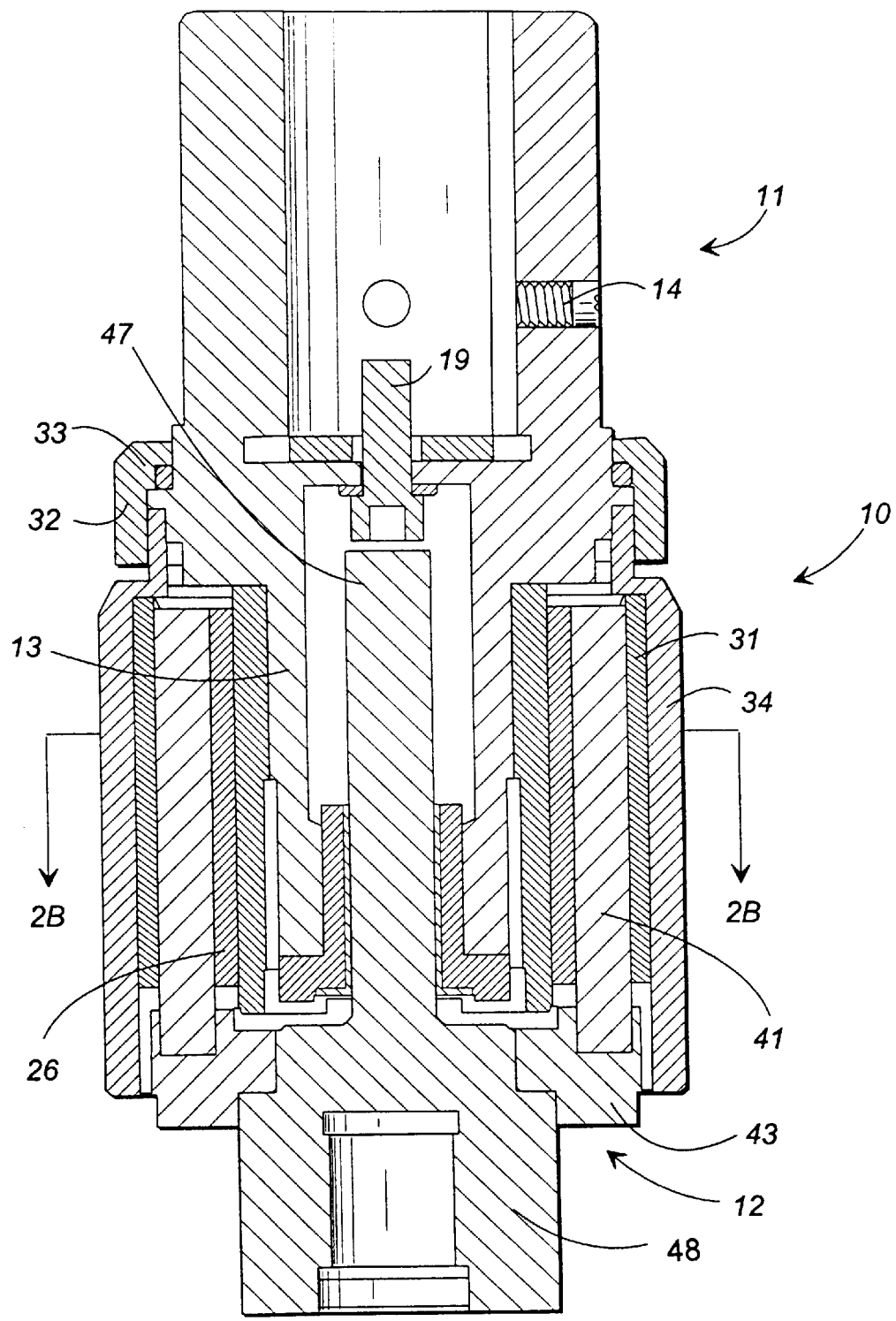
FIG. 2A is a schematic, sectional view of the magnetic coupling assembly of FIG. 1.
Figures 2B, 3:
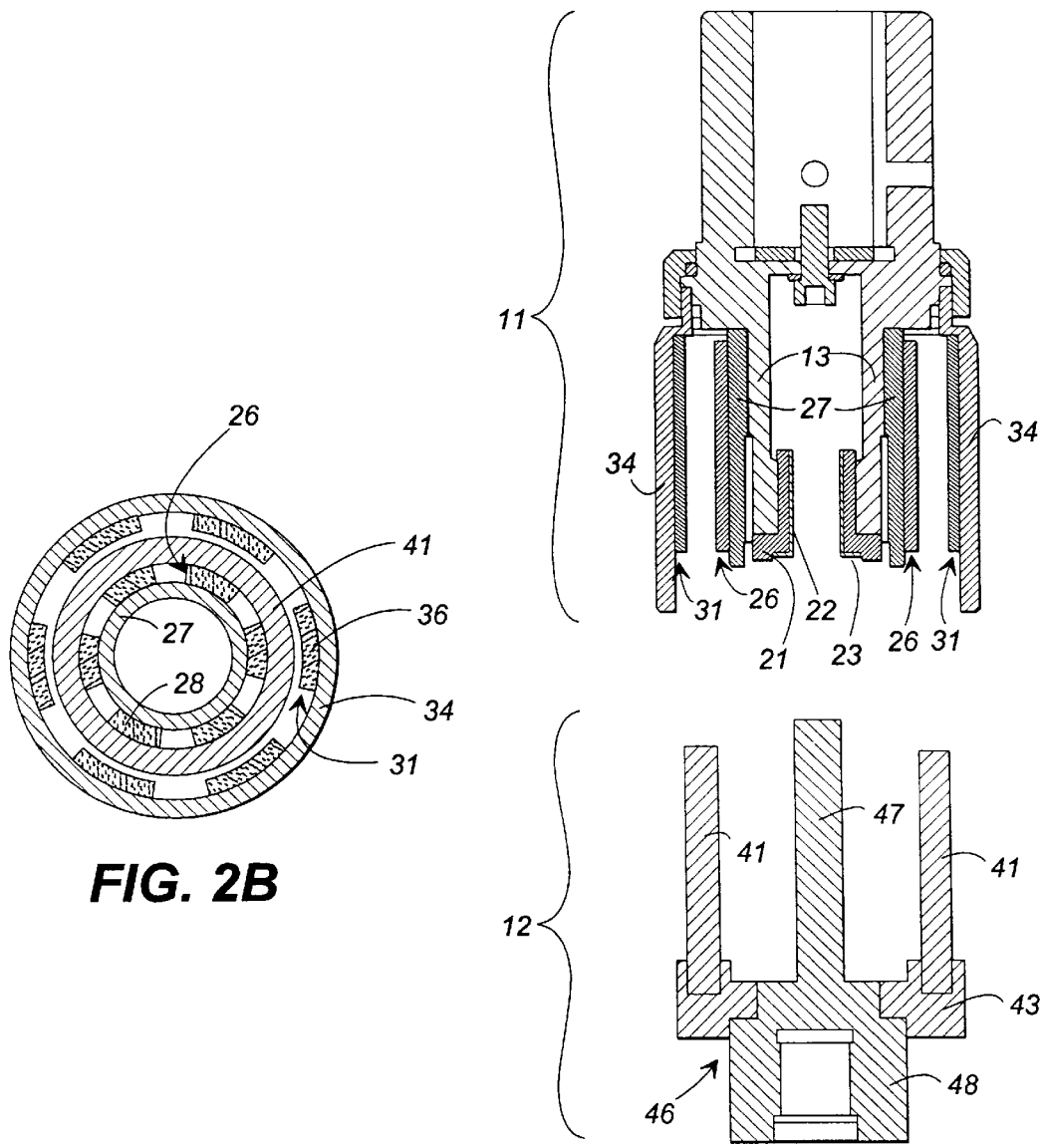
FIG. 2B is a sectional view of the magnetic coupling assembly of FIG. 2A, taken along the lines 2B—2B, with some elements omitted therefrom for clarity of illustration.
FIG. 3 is a schematic sectional illustration of the magnetic coupling assembly of FIG. 1, showing the magnetic coupling assembly separated into its two major portions.

Having described the exploded view of the magnet coupling assembly 10 shown in FIG. 4, attention is directed to FIGS. 2A and 2B wherein the assembled magnetic coupling assembly 10 can be understood more fully. For example, referring to both FIGS. 2A and 2B, (in FIG. 2B some elements are omitted for clarity) one can see that the core sub-assembly or driven part 12 is nestably received into the receiver sub-assembly 11. In particular, the cylindrical portion 41 of the driven member is received in the air gap between the outer magnet assembly 31 and inner magnet assembly 26. For example, the driven member 41 is positioned between outer magnet 36 and inner magnet 28. The outer magnet assembly comprises the individual outer magnets, such as outer magnet 36 and the outer shell 34. The outer shell is made of stainless steel, while the outer magnets are permanent magnets made of rare earth materials. Preferably, the rare earth magnets are samarium cobalt with a very long half-life. Also preferably, the gap between the outer magnets and the surface of the cylindrical portion 41 of the driven member is uniformly small. To attain this, the outer magnets are pressed into rough shape and adhered by epoxy to the inside surface of the shell 34 and then are ground or precision-machined to a finished inside diameter. Likewise, the inner magnets, such an inner magnet 28, are of a similar material and are adhered to the mild steel inner shell 27 after being pressed into shape. The outside diameter of the inner magnet assembly is then precision-ground or precision-machined to a finished diameter. It should be noted that the inner shell 27 and the outer shell 34 in the longitudinal regional of the magnets should be a "magnetic" material (one that readily transmits magnetic lines of force) in order to provide maximum effectiveness of the magnets and to maintain the life of the magnets. In this regard, the shells are made of mild steel and then are nickel-plated and painted with epoxy in order to provide the high resistance to corrosion necessary for use in the food and beverage industry and to protect the magnets themselves. The driven member is made up of two different materials. The cylindrical portion 41 of the driven member is a magnetic materials made up of an aluminum-nickel-cobalt alloy, a so-called AlNiCo alloy. The flange 43 is made of stainless steel.

Turning now to FIG. 3, one can see the upper receiver sub-assembly 11 separated from the lower core sub-assembly 12. It should be noted that when these two sub-assemblies are separated as shown in FIG. 3, no power is transmitted from the magnets in the upper sub-assembly through the driven member in the lower sub-assembly. In this regard, the lower sub-assembly, and a drive load attached thereto, may continue to spin freely or remain at rest depending on prior conditions.

Importantly, the magnetic coupling assembly just described is designed to be separated into its two major sections or sub-assemblies during normal use. The drive portion and the driven portion can be separated as shown in the drawing figures. The drive portion, as described, has the dual sets of opposing magnets which are carefully aligned to be opposite each other. The driven portion includes the magnetic cylinder and the alignment aid that allows the driven portion to slip into the drive portion without touching any part of the drive portion except for the alignment means.

In use, the magnetic coupling assembly 10 is attached to a power source and is driven as required. The drive portion 11, including the two sets of cylindrically arranged magnets, creates a powerful magnetic attraction between the outer ring of magnets and the inner ring of magnets. The driven portion being introduced into the gap between the inner and outer rings of magnets causes the driven portion to be influenced by the strong attraction of the two rings of magnets. If the torque produced by the drive portion does not exceed the load attached to the driven portion, then the drive portion pulls the driven portion along and accelerates it to the speed at which the drive portion is currently rotating. There is an amount of torque adjustment that is available by adjusting the alignment of the two rings of magnets with respect to each other so that the effective distances between the individual magnets is changed. Maximum torque is achieved with the magnets directly opposite each other. Lesser amounts of torque can be achieved by off-setting the inner magnets from the outer magnets so that they are no longer perfectly aligned.

Referring now to FIG. 5, a capping apparatus 100 according to a second preferred form of the invention is shown. The capping apparatus 100 preferably is a rotary-type or carousel-type machine in which containers and caps are fed in along the periphery of the carousel and travel around therewith so that the capping operation can take place as the capping head and the container travel along together. The capping apparatus 100 incorporates therein the magnetic coupling assembly 10 previously described. The capping apparatus 100 includes numerous stations positioned around the periphery of the carousel and a magnetic coupling assembly 10 at each station. In the drawing figure, only two such stations are depicted, which are on opposites sides of the carousel. However, those skilled in the art will recognize that a series of such stations are evenly spaced along the periphery of the carousel to provide continuous capping operation. Moreover, in the drawing figure, the magnetic coupling assembly 10 on the left side of the figure depicts the magnetic coupling assembly 10 in its engaged or nested configuration in which power is being transmitted from a drive mechanism to the capping head, while the magnetic coupling assembly 10' on the right-hand side of the drawing figure depicts the magnetic coupling assembly separated and effectively de-coupling the capping head from the drive mechanism.

The capping apparatus 100 includes a rotary base 101 supported above the floor of the workshop. Anti-rotation columns or posts 102 and 103 are supported upon the base 101. A drive motor 104 operating through a drive gear 105 drives a large driven gear assembly 106 in rotation. The driven gear assembly 106 in turn drives spindle gears 108, 108'. The spindle gears 108, 108' drive the magnetic coupling assemblies 10, 10' (at least the upper end portion thereof) at a constant speed.

A rotating head carrier 110 is driven by drive motor 109 and carries along therewith the chain drive 111 which transports the containers along a container support table 112. A capping head 115 is supported by a capping head station 116 and includes a chuck 117 and a height compensator 118. At the top end 119 of the capping head, the capping head is mounted to the lower part or core assembly of the magnetic coupling assembly 10.

A cam 120 operates on a cam follower 121 associated with the top end 119 of the capping head to move the capping head up and down according to the rise and fall of the cam track. In this way, as the station moves around the carousel, the capping head 115 can be moved up and down to engage and disengage (bring together and separate) the magnetic coupling assembly 10. In this way, the capping head can be brought up to rotational speed by the magnetic coupling assembly and then the magnetic coupling assembly can be separated to place the capping head in an inertial free-spinning state, and the capping head can be pushed downwardly with a desired amount of force while the capping head is free-spinning to place a cap on a container. As resistance to further rotation is developed by the cap being placed against the container (as in spin welding), such resistance is better able to overcome the inertia of the capping head when the capping head is not also being driven by the drive mechanism.

While the invention has been disclosed in preferred forms, it will be apparent to those skilled in the art that many modifications, additions, and deletions can be made therein without departing from the spirit and scope of the invention as set forth in the following claims.

We claim:

1. A magnetic coupling for selectively coupling a driven head with a drive mechanism, said magnetic coupling comprising:

a first part;

a second part selectively insertable into said first part;

one of said first and second parts having mounted therein permanent magnets and the other of said first and second parts having a magnetic portion to cooperate with said permanent magnets and to be driven by said permanent magnets, said permanent magnets comprise a first group of permanent magnets arranged in a generally cylindrical pattern and a second group of permanent magnets arranged in a generally cylindrical pattern, and wherein said second group of permanent magnets is positioned concentrically within said first group of permanent magnets, there being an air gap between the two groups of magnets for receiving said magnetic portion; and wherein with said second part inserted into said first part rotational power can be transmitted from said permanent magnets to said magnetic portion, and wherein with said second part withdrawn from said first part, rotational power is not transmitted from said permanent magnets to said magnetic portion and the driven head is thereby de-coupled from the drive mechanism.

2. A magnetic coupling as claimed in claim 1 wherein said magnetic portion comprises a cylindrical element sized and configured to be received into said air gap between said first and second groups of magnets.

3. A magnetic coupling as claimed in claim 2 wherein said cylindrical element comprises an alloy of aluminum, nickel, and cobalt.

4. A magnetic coupling as claimed in claim 1 wherein each magnet in said first group is positioned directly across from a corresponding magnet in said second group.

5. A magnetic coupling as claimed in claim 1 further comprising means for adjusting the angular orientation of said first group magnets relative to said second group of magnets.

6. A magnetic coupling as claimed in claim 1 further comprising a female guide element and a male guide element which cooperate to help guide said second part into said first part.

7. A magnetic coupling as claimed in claim 6 wherein said female guide element comprises a bearing having a smooth bore and wherein said male guide element comprises a cylindrical guide rod.

8. A magnetic coupling as claimed in claim 1 wherein said first group of permanent magnets is mounted to a cylindrical magnetic backing and wherein said second group of permanent magnets is mounted to a cylindrical magnet backing.

9. A magnet coupling as claimed in claim 1 wherein said first and second groups of magnets comprise rare earth magnets.

* * * * *